(12) United States Patent
Kosock et al.

(10) Patent No.: US 6,216,470 B1
(45) Date of Patent: Apr. 17, 2001

(54) METHOD AND APPARATUS FOR PELLETING OR GRANULATING A LIQUID OR PASTRY SUBSTANCE

(75) Inventors: Stefan Kosock, Krefeld; Wolfgang Hoffmanns, Willich, both of (DE)

(73) Assignee: Messer Griesheim GmbH (DE)

( * ) Notice: Subject to any disclaimer, the term of this patent is extended or adjusted under 35 U.S.C. 154(b) by 0 days.

(21) Appl. No.: 09/374,864

(22) Filed: Aug. 16, 1999

(30) Foreign Application Priority Data

Aug. 19, 1998 (DE) .............................................. 198 37 600

(51) Int. Cl.[7] .............................. F25D 13/06; F25D 13/02
(52) U.S. Cl. ...................................... 62/63; 62/64; 62/375
(58) Field of Search ................................... 62/63, 64, 375

(56) References Cited

U.S. PATENT DOCUMENTS

| | | | |
|---|---|---|---|
| 3,298,188 | * | 1/1967 | Webster et al. .......................... 62/64 |
| 3,605,427 | * | 9/1971 | Rudy ........................................ 62/64 |
| 3,774,524 | * | 11/1973 | Howard ................................... 99/483 |
| 4,403,479 | * | 9/1983 | Rasovich ................................. 62/63 |
| 4,843,840 | * | 7/1989 | Gibson ................................... 62/375 |
| 4,852,358 | * | 8/1989 | Acharya et al. .......................... 62/63 |
| 5,220,803 | * | 6/1993 | Kiczek ..................................... 62/63 |
| 5,522,227 | * | 6/1996 | Appolonia ............................... 62/63 |

* cited by examiner

Primary Examiner—William Doerrler
(74) Attorney, Agent, or Firm—Connolly Bove Lodge & Hutz LLP

(57) ABSTRACT

The apparatus for pelleting or granulating a liquid or pasty substance with a liquid cooling medium contains a pump (2) for the liquid cooling medium, a channel (5), open at the top and arranged horizontally or at an angle, for the liquid cooling medium, a feed device (4) for the substance to be pelleted, a return device (6) for the liquid cooling medium, and a heat-insulated conveying device (7). The apparatus is used in a method in which, by means of a gaseous cooling medium such as cold exhaust air, the pellets are not frozen through until in the region of the conveying device.

14 Claims, 2 Drawing Sheets

Figure 1:
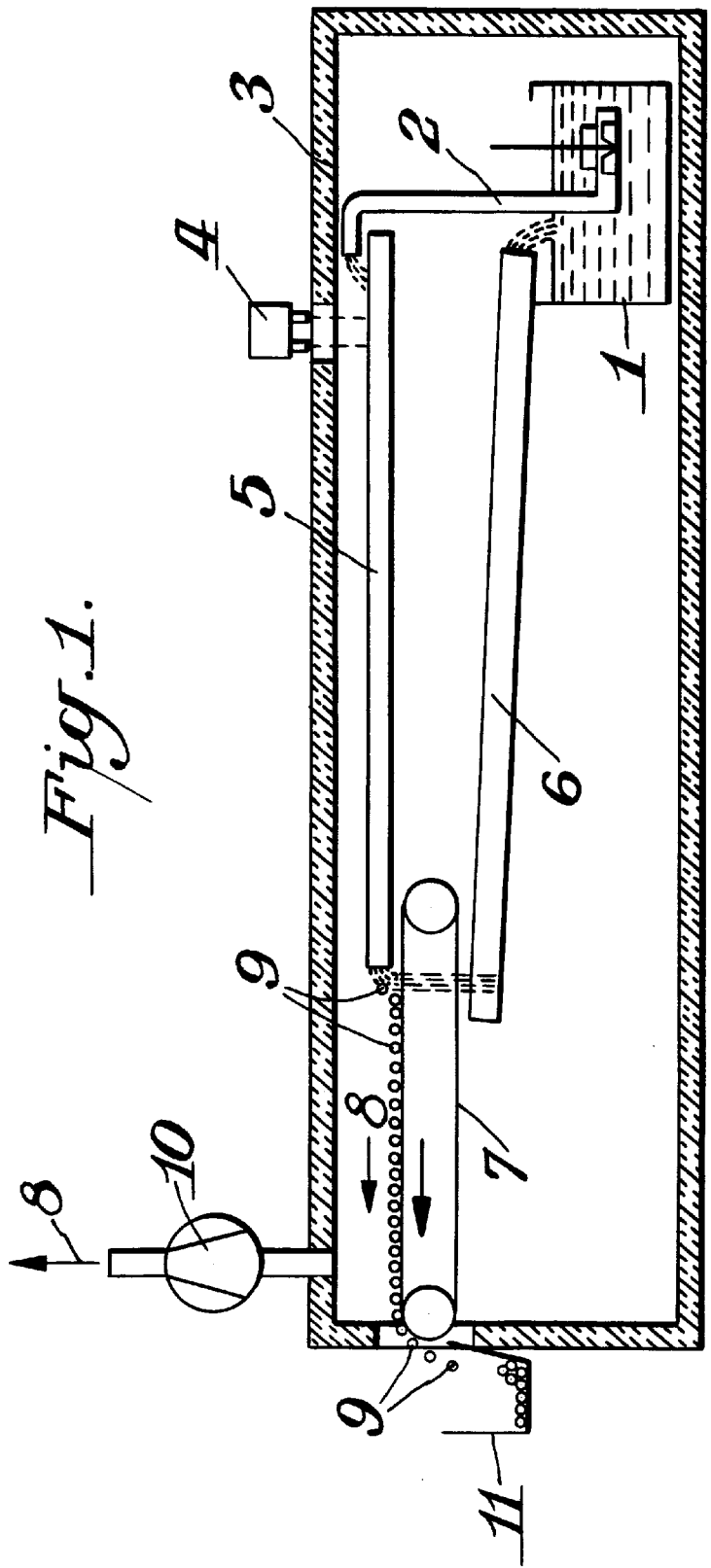

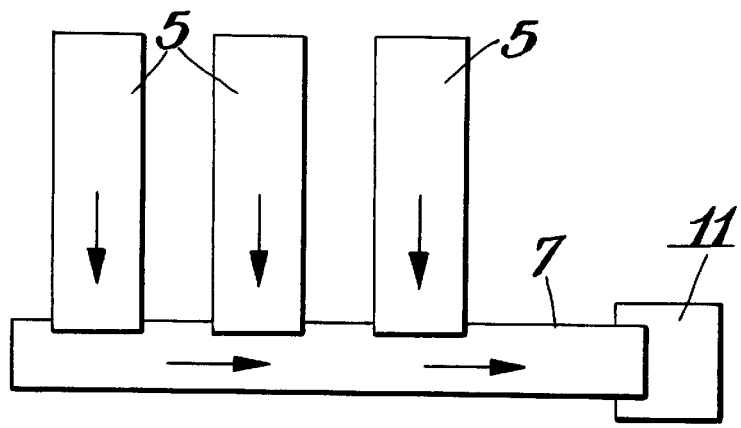
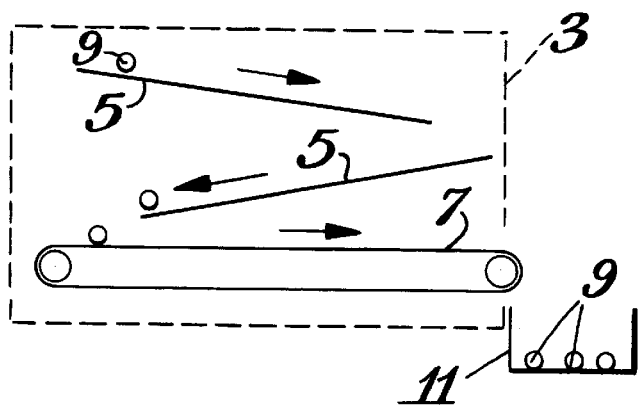
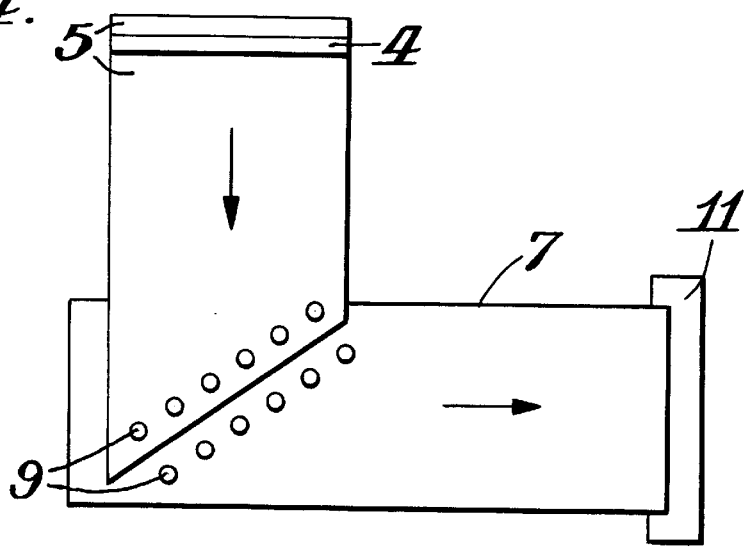

METHOD AND APPARATUS FOR PELLETING OR GRANULATING A LIQUID OR PASTRY SUBSTANCE

BACKGROUND OF INVENTION

This application is related to DE 198 37 600.6 filed on Aug. 19, 1998, which is incorporated by reference in its entirety for all purposes.

The invention relates to a method and an apparatus for pelleting or granulating a liquid or pasty substance in a liquefied, low-boiling cooling medium, the substance being fed into a flow of the cooling medium and being fed together with the cooling medium to a separating device in which the substance is separated from the cooling medium and the latter is returned again into the process cycle.

U.S. Pat. No. 4,655,047 discloses a method and an apparatus of this type. Pellets of liquid egg are produced by virtue of the fact that the liquid egg is dripped through a nozzle into a liquid flow of a cryogenic liquid which runs over a sloping trough, and the liquid flow with the produced pellets leads to a vibratory screen. The cryogenic liquid is returned and the pellets are conveyed via the screen into a collecting container. The apparatus is no longer insulated in the region of the vibratory screen and the collecting container. The method requires the pellets to be frozen through before they encounter the screen, since otherwise the pellets will be damaged. The flow-medium section must therefore be of relatively large dimensions in order to achieve a dwell time which leads to frozen-through pellets.

SUMMARY OF INVENTION

The object of the invention is to provide a method and an apparatus for producing pellets with which a high yield of large-size pellets or granule bodies can be produced without problem and the disadvantages of known methods are avoided.

As a rule, the substance to be pelleted is liquid or pasty. Examples are liquid or pasty preparations for the production of ice cream or other foodstuffs.

The apparatus contains a storage reservoir for a liquid cooling medium, a delivery device for the cooling medium, a feed device for the substance to be pelleted, a flow section with the liquid cooling medium (e.g. a channel or a shallow trough), a device for the return of cooling medium to the storage reservoir (e.g. a return channel), and a conveying device (e.g. a belt conveyor) for freezing out and transporting the pellets. The pellets are frozen out in or on the conveying device by means of a gaseous cooling medium.

The liquid cooling medium is preferably a cryogenic liquid such as cryogenically liquefied gases, in particular cryogenically liquefied nitrogen ($LN_2$).

Gaseous cooling media are, for example, cold nitrogen, cold air, cold inert gases such as helium or argon, or cold carbon-dioxide gas. The gaseous cooling medium preferably has a temperature within the range of minus 196 EC to 0 EC, in particular preferably from minus 196 EC to minus 40 EC. The gaseous cooling medium is preferably cooled to the temperature by means of the liquid cooling medium or formed from the liquid cooling medium (e.g. vaporizing cooling medium). For example, the gaseous cooling medium is cold nitrogen gas, formed from liquid nitrogen as liquid cooling medium, or is a mixture of cold nitrogen gas and air. The cold atmosphere which develops in the apparatus, in particular in the region of the storage reservoir for liquid cooling medium, in the region of the flow channel and in the region of the return device for liquid cooling medium, is especially preferred for use as gaseous cooling medium. The cold atmosphere is also referred to as exhaust air.

A belt conveyor is especially preferred as a device for conveying the pellets to a collecting vessel or collecting container. The belt conveyor permits careful transport of pellets which have not yet been frozen out and which are easily damaged or deformed mechanically. The transport belt of the belt conveyor is preferably made of a material permeable to the liquid cooling medium, e.g. a reticular belt, a latticed belt or a perforated belt. The transport belt consists, for example, of movable metal links. As a rule, the belt conveyor is a plane belt conveyor. For a space-saving construction, it can be very advantageous to use a belt conveyor having a spirally directed transport belt (spiral belt). The transport belt is made, for example, of stainless steel. The conveying path, that is, the length of the belt conveyor (conveying device) in the case of a belt conveyor having a plane conveying path, is generally within the range of 2 to 3 meters in particular around 2 to 2.5 meters.

The complete freezing or freezing-out of the particles or pellets on or in the conveying device, in particular on the belt conveyor, is effected by cooling with gaseous cooling medium, preferably the cold exhaust air. The gaseous cooling medium is brought into contact with the particles or pellets to be completely frozen (frozen out). A flow of the gaseous cooling medium is advantageously directed across the pellets to be frozen out. The flow of gaseous cooling medium is produced, for example, by means of a gas-extraction device. The gas-extraction device may be constructed, for example, with an extraction fan.

The apparatus is preferably heat-insulated not only in the operative region of the liquid cooling medium (cooling-mediun storage reservoir, flow section) but also in the region of the conveying device. A belt conveyor having tunnel-like heat insulation (heat-insulated casing) is used as conveying device in an especially advantageous manner. Tunnel-like, heat-insulating encasement of the conveying device, in particular of the belt conveyor, forms a gas passage through which the gaseous cooling medium is directed. As a rule, the gas passage contains the conveying device. However, the gaseous cooling medium may also be directed by appropriate measures in such a way that a gas passage (called primary gas passage) which is limited in height, e.g. by the surface of the transport belt of the belt conveyor and the heat-insulated casing, is produced. The height of the primary gas passage is, for example, within the range of 2 to 30 cm, preferably 2 to 10, in particular 2 to 5 cm. The velocity of the gas flow of the gaseous cooling medium (e.g. the cold exhaust air) in the gas passage is influenced by the height of the gas passage, in particular of the primary gas passage. High velocities of the gas flow are advantageous for the cooling of the material to be conveyed (pellets). The velocity of the gas flow of the gaseous cooling medium is, for example, within the range of 1 to 50 meters per second, preferably around 10 to 30 meters per second, in particular preferably around 15 to 25 meters per second.

In the case of an apparatus and a method according to the invention, the substance to be pelleted is fed into a laminar flow of the liquid cooling medium at a point downstream of a pump delivering the cooling medium, provision being made for the flow to be laminar at the feed point. The substance, which is generally liquid or pasty, is fed in, for example, as described in U.S. Pat. No. 4,655,047, to which reference is hereby made. The substance which is fed in is only partly frozen (frozen on) in a laminar cooling-medium flow section on a flow channel or in a shallow trough in order to fix the shape, generally spherical, of the substance fed in. Preferably only a kind of solid envelope is formed. The complete freezing-out of the particles (pellets) formed from the substance is effected only once they are on/in the conveying device by means of gaseous cooling medium.

The heat insulation of the pelleting apparatus and the heat insulation of the conveying device, in particular the belt conveyor, advantageously form a unit, e.g. by means of a uniform or continuous heat-insulated casing.

In this way, large-size pellets of the substance to be frozen can be produced. A high yield of large-size pellets is ensured. The apparatus can be of more compact construction and energy can be saved by utilizing the cold of the resulting cold exhaust gas during the operation of the apparatus.

THE DRAWINGS

FIG. 1 shows a vertical section through an apparatus according to the invention.

FIG. 2 shows schematically (plan view) parts of an apparatus according to the invention, having a plurality of flow channels which are arranged transversely to the conveying direction of a belt conveyor. The heat-insulating casing of flow channels and belt conveyor is not shown. The arrows depicted indicate the direction of flow in the flow channels and the direction of the conveying motion of the belt conveyor.

FIG. 3 shows a scheme (vertical section) of an apparatus according to the invention, only particular parts and their arrangement being illustrated. The arrows depicted indicate the direction of flow in the flow channels and the direction of the conveying motion of the belt conveyor.

FIG. 4 shows schematically (plan view) parts of an apparatus according to the invention, having a flow channel with a slanted end. The heat-insulating casing of flow channel and belt conveyor is not shown. The arrows depicted indicate the direction of flow in the flow channel and the direction of the conveying motion of the belt conveyor.

DETAILED DESCRIPTION

An entire apparatus for the pelleting of, as a rule, liquid or pasty substances is schematically illustrated in FIG. 1. A storage reservoir 1 for a low-boiling, liquefied cooling medium (preferably liquid nitrogen; $LN_2$) is located in a heat-insulated casing 3, the level of which cooling medium is monitored by means of a level measurement and is automatically topped up from a storage tank. By means of a pump 2, the liquefied, low-boiling cooling medium, via a channel 5 open at the top and arranged horizontally or downwards at an angle, is delivered from the storage reservoir 1 in such a way that a laminar flow of the cooling medium is obtained on the channel 5. Downstream of the pump 2, a feed device 4 for the substance to be pelleted is located above the cooling-medium flow on the channel 5. The feed device 4 is therefore arranged in the region of that end of the channel 5 which faces the storage reservoir 1. The feed device 4 generally has at least one nozzle. The substance is dripped here into the cooling-medium flow and is moved along with the cooling-medium flow to the other end of the channel 5. The displacement section of the cooling-medium flow or the length of the channel 5 is dimensioned in such a way that the liquid cooling medium removes just so much energy from the substance to be pelleted that the outer envelope of the pellets 9 is frozen on, but the core is still liquid. Some of the cooling medium vaporizes in the process. The common flow of remaining liquid cooling medium and half-frozen pellets is directed at the bottom end of the channel 5 onto a belt conveyor 7. This belt conveyor 7 is constituted in such a way that the remaining liquid cooling medium passes through the belt of the belt conveyor, but the frozen-on pellets remain lying on the belt conveyor 7 and are transported further by the belt conveyor 7. The remaining cooling medium is delivered back into the storage reservoir 1 by means of a return channel 6. The channels 5, 6 and the belt conveyor 7 are encased by a heat-insulating casing 3 in such a way that all the vaporized liquid cooling medium which has accumulated in the installation is drawn off above the belt conveyor 7 in parallel flow with the transport direction of the pellets by means of an exhaust-gas fan 10 installed at the end of the belt conveyor 7; that is, the direction of flow of the gaseous cooling medium 8 (exhaust air) corresponds to the transport direction of the pellets on the belt conveyor 7. In the process, the gaseous cooling medium, when flowing through this displacement section, continues to remove energy from the pellets and heats up as a result. In this case, the belt length and speed of the belt conveyor and the flow conditions of the vaporized cooling-medium flow are selected in such a way that the pellets are completely frozen through at the end of the belt conveyor. At the same time, the belt conveyor 7 may be arranged in line with the pellet channel 5, in the opposite direction or crosswise. In a crosswise arrangement, the common use of one discharging belt 7 for a plurality of channels is possible (FIG. 2). Furthermore, division of the channel 5 into a plurality of shorter channels (FIG. 3), on which the liquid cooling-medium flow/pellet flow flows forwards and backwards, is advantageous, e.g. for a space-saving type of construction.

FIG. 4 shows a plan view of an apparatus with a flow channel having a slanted end, only particular parts being illustrated. Drips of the substance to be pelleted pass onto the flow channel 5 via a so-called drip beam as feed device 4 having a row of several nozzles, in the course of which the spherical drips freeze ("frozen-on" particles or pellets) in the outer region (in the region of the surface). The flow channel 5 is slanted in surface area at the end facing the belt conveyor 7, so that the frozen-on pellets do not pass onto the belt conveyor 7 in a line, but are distributed over the width of the belt conveyor.

In this case, the following values, for example, have resulted for an apparatus (installation) having a capacity of about 300 kg of pellets. For example, an aqueous suspension having a solids content of 5% for pellets of a diameter of about 6 mm is frozen. Liquid nitrogen serves as the cooling medium. The flow velocity on the channel 5 in this case is 0.5 meters per second. The channel has a width of 1 meter and a length of 3 meters. The consumption of liquid nitrogen is 2.4 kg/kg of product (pellets). The dwell time of the pellets on the belt conveyor is preferably 30 seconds. Longer dwell times generally lead to the same result. The core temperature of the pellets at the end of the belt conveyor (end at the collecting container 11) is −20 EC. The temperature of the nitrogen gas (exhaust gas) at the end of the channel 5 is about −185 EC. The temperature of the nitrogen gas directly upstream of the exhaust-gas fan is −40 EC.

List of reference numerals

1 Storage reservoir for cryogenic liquid (liquid nitrogen; $LN_2$)

2 Delivery device for cryogenic liquid (pump for $LN_2$)

3 Heat-insulating casing

4 Feed device for the substance to be pelleted (e.g. drip beam)

5 Flow channel or trough for cryogenic liquid
6 Return channel for cryogenic liquid
7 Belt conveyor
8 Exhaust gas
9 Pellet
10 Exhaust-gas extraction (exhaust-gas pump)
11 Collecting container for finished (frozen-out) pellets

What is claimed is:

1. Apparatus for pelleting or granulating a liquid or pasty substance with a liquid cooling medium, containing a pump for the liquid cooling medium, a channel which is open at its top and arranged non-vertically for the liquid cooling medium, a feed device for the substance to be pelleted, a return device for the liquid cooling medium, a heat-insulated conveying device, characterized in that the conveying device comprises a belt conveyer having a tunnel-like heat insulated casing, forming a gas passage through which cold exhaust gaseous cooling medium is flowing by means of an extraction device.

2. Apparatus according to claim 1, characterized in that the belt of the belt conveyor is permeable to the liquid cooling medium.

3. Apparatus according to claim 2, characterized in that a cryogenically liquefied gas or gas mixture is used as the liquid cooling medium.

4. Apparatus according to claim 3, characterized in that the conveying device with the material to be conveyed is cooled with a gaseous cooling medium.

5. Apparatus according to claim 1, characterized in that at least the conveying device is arranged transversely to one or more channels.

6. Apparatus according to claim 5, characterized in that at least two or more channels are combined.

7. Apparatus according to claim 1, characterized in that a cryogenically liquefied gas or gas mixture is used as the liquid cooling medium.

8. Apparatus according to claim 1, characterized in that the conveying device with the material to be conveyed is cooled with a gaseous cooling medium.

9. Apparatus according to claim 1, characterized in that the apparatus contains an extraction device for a gaseous cooling medium.

10. Apparatus according to claim 1, characterized in that at least two or more channels are combined.

11. Apparatus according to claim 1, characterized in that the belt conveyor has a plane belt conveyor.

12. Apparatus according to claim 1, characterized in that the belt conveyor has a spiral belt.

13. Method of producing pellets from liquid or pasty substances by means of a liquid cooling medium, characterized in that the substance to be pelleted is introduced into a liquid flow of the cooling medium, the liquid flow is taken with pellets which have not yet frozen through to a conveying device, where the liquid cooling medium is returned into a collection device selected from the group consisting of a storage reservoir and a channel and a trough, the pellets are frozen out at the conveying device by means of a gaseous cooling medium, and the conveying device comprising a belt conveyor having a channel-like heat insulated casing forming a gas passage through which cold exhaust gaseous cooling medium flows by means of an extraction device.

14. Method according to claim 13, characterized in that cold exhaust air is used as gaseous cooling medium.

* * * * *